United States Patent [19]

Heckman

[11] 4,050,654
[45] Sept. 27, 1977

[54] HANG GLIDER

[76] Inventor: Ronald A. Heckman, 88 Crest Road, East, Rolling Hills, Calif. 90274

[21] Appl. No.: 754,572

[22] Filed: Dec. 27, 1976

[51] Int. Cl.² .............................................. B64C 3/40
[52] U.S. Cl. ....................................... 244/49; 244/16; 244/DIG. 1
[58] Field of Search ..................... 244/16, 153 R, 154, 244/DIG. 1, 49, 46

[56] References Cited

U.S. PATENT DOCUMENTS

| 989,786 | 4/1911 | Lee et al. | 244/DIG. 1 |
| 3,507,150 | 4/1970 | Stengel | 244/49 |
| 3,936,012 | 2/1976 | Murray | 244/16 |

FOREIGN PATENT DOCUMENTS

| 1,546,780 | 10/1968 | France | 244/DIG. 1 |
| 23,104 of | 1909 | United Kingdom | 244/49 |
| 26,855 of | 1912 | United Kingdom | 244/DIG. 1 |

OTHER PUBLICATIONS

Hewes, "Free-Flight Investigation of Radio-Controlled Models with Parawings" NASA TN D-927, Sept. 1961.

Primary Examiner—Trygve M. Blix
Assistant Examiner—Galen Barefoot
Attorney, Agent, or Firm—Gausewitz, Carr & Rothenberg

[57] ABSTRACT

A foot-launched passenger carrying wing capable of flight including a frame, a flexible wing covering the frame, a keel, a bracket slidable on the keel, cross brace members pivotally attached to the bracket at one end and to leading edge members of the frame at the other end, and cables connecting the parts to provide an operative structure when the bracket is moved in one direction to extend the frame into flying condition and to collapse the frame when the bracket is moved in the opposite direction. Movement of the bracket also adjusts the billow of the sail and the dihedral of the frame. The wing sail is attached to the leading edge members along their entire length and to the keel along a portion of the rearward end thereof. An arrangement is provided to adjust the bracket before or during flight to provide different billow and dihedral conditions.

10 Claims, 19 Drawing Figures

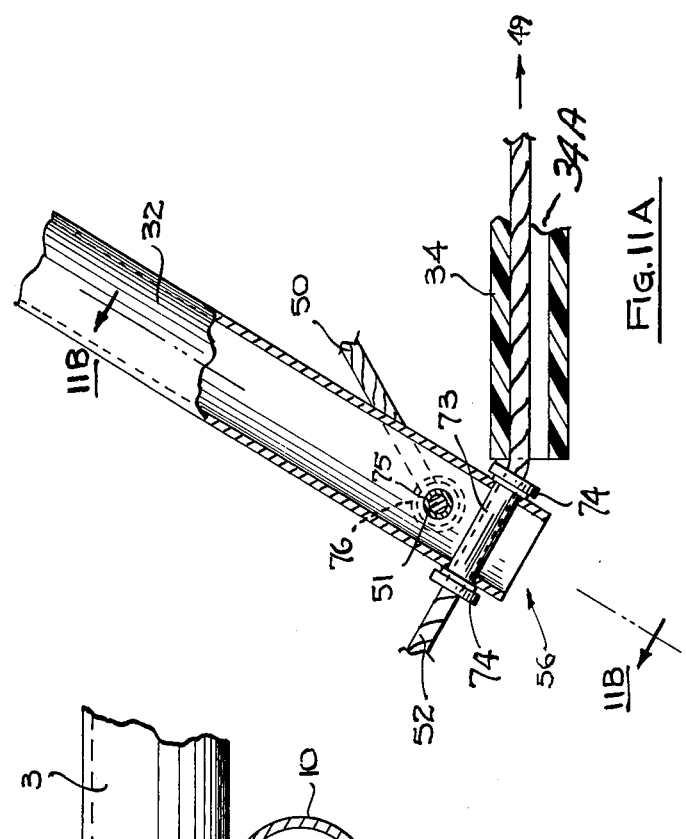
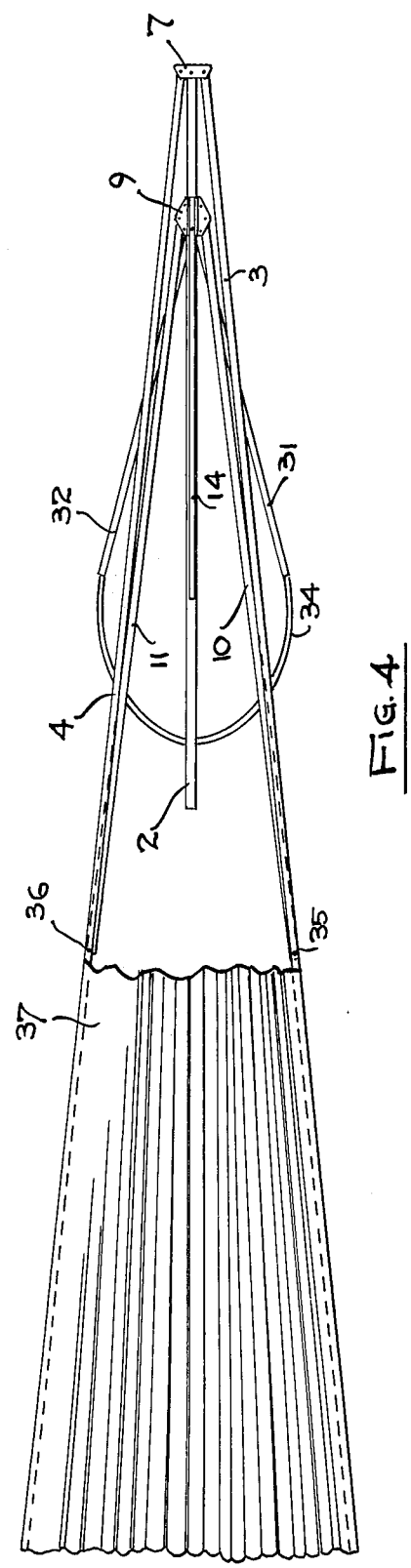
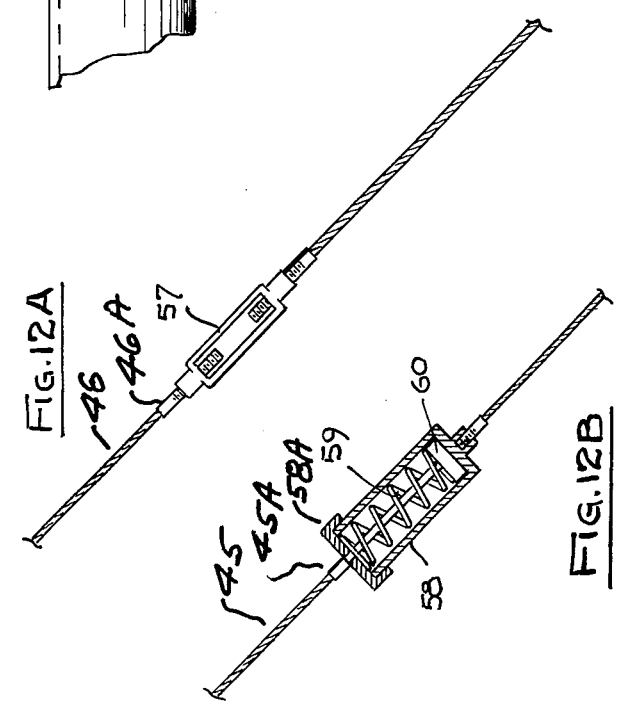

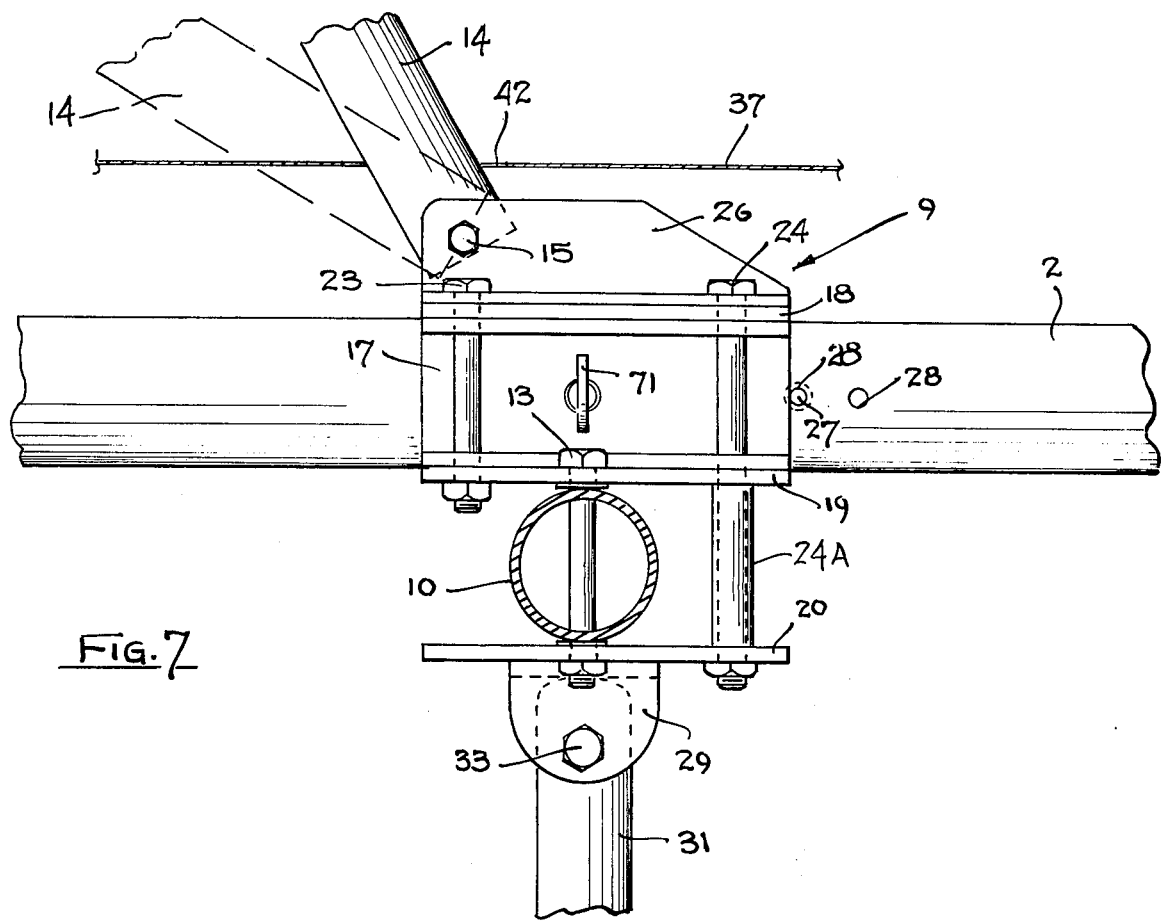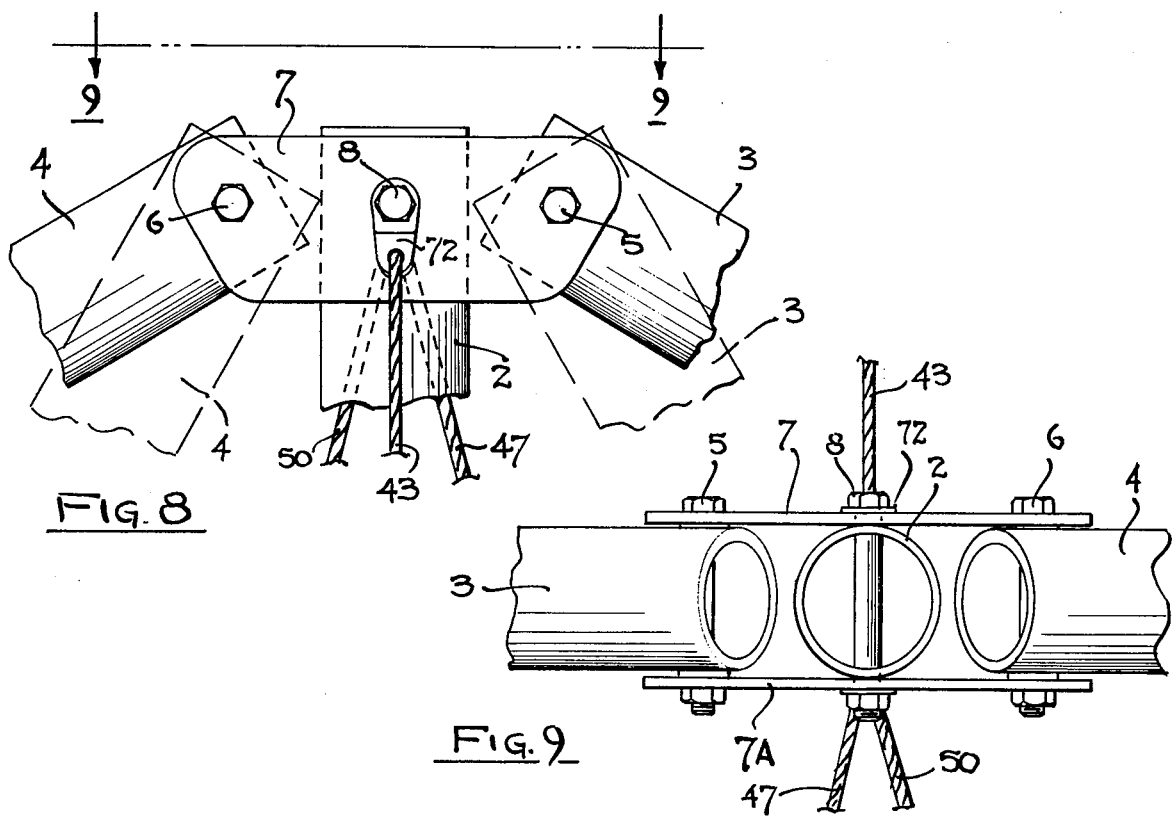

HANG GLIDER

BACKGROUND OF THE INVENTION

The present invention relates to hang gliders and in particular to a hang glider that is readily collapsible, is provided with simple, yet effective means for changing its flight characteristics and is also provided with built-in safety aspects.

DESCRIPTION OF THE PRIOR ART

Hang gliders have been known for many years as may be seen in a handbook on Hang Gliding or Skysurfing published by Daniel F. Poynter, 48 Walker Street, North Quincy, Mass. 02171.

Generally speaking, hang gliding comprises flying lightweight, passenger carrying wings which are usually foot launched by the passenger and controlled in flight by weight shifting. The passenger usually launches the glider by running off a bluff or down a hill and when airborne, is suspended from the glider by a harness or seat which is suitably attached to the glider. The glide may be a slow, no-wind descent or if air currents are encountered, may entail climbing to relatively high altitudes and flights of several hours.

The usual hang glider is made up of a framework that may be collapsed by dismantleing or disconnecting its parts. This arrangement is undesirable because of wear on the parts and the possibility of error in reassembly of the parts.

Means have previously been provided for adjusting the billow of the wing sail and the dihedral of the frame to vary the lateral stability so that an increase in the billow and dihedral will provide increased lateral stability for novice operation while a decrease in the billow and dihedral will provide better performance and greater maneuverability for expert use.

U.S. Pat. No. 3,936,012 exemplifies the prior art in the showing of means to adjust the billow and the dihedral of the glider as well as for collapsing the glider.

Flexible wings are well known as shown in U.S. Pat. Nos. 3,942,747; 3,381,919; 3,356,316; 3,286,957; 3,185,412 and 3,423,049.

Folding or collapsible kites are also well known as shown by U.S. Pat Nos. 1,984,229; 2,465,917 and 3,305,198.

SUMMARY OF THE INVENTION

The present invention comprises a hang glider constructed and arranged to be collapsed or extended into an operative position without dismantleing or disconnecting and re-connecting any of its parts. To accomplish this result, the parts forming the frame of the glider are pivotally connected and certain of them are pivotally connected to a master hinge bracket which is slidable on a keel to and from a collapsed position. The ends of the frame are connected by cables or brace wires in a pre-selected manner to hold the frame in operative position when extended. The brace wires are of such length that they are tensioned when the master hinge bracket is moved to frame-extending position.

Adjustment of the master hinge bracket on the keel simultaneously adjusts the billow of the sail and the dihedral of the frame to arrange the glider for different flight conditions according to the skill of the pilot and weather conditions. Thus, increasing the billow of the sail and the dihedral of the wing increases the inherent lateral stability while decreasing the maneuverability and glide performance. Conversely, a decrease in the billow of the sail and the dihedral of the wing decreases the inherent lateral stability while enhancing the maneuverability and glider performance.

The wing sail is attached along its front edge to the leading edge spars and to the keel along approximately the rearward one-quarter portion thereof. The forward portion of the sail is free and clear of the forward keel structure during flight thereby allowing the wing sail to camber.

Although the master hinge bracket is preferably adjusted prior to flight for wind conditions and the skill of the pilot, it is possible for a skilled pilot to adjust the position of the master hinge bracket during flight for different conditions that may be encountered or for conditions which may be anticipated for landing.

The control bar which ordinarily is made of rigid parts, is provided with a flexible base portion to aid in folding the glider and also to provide a safety factor for the pilot.

The improved hang glider of this invention is simple to use, fool-proof in preparation for flight and free of difficulties and dangers that ordinarily cause injury or death to hang glider pilots.

BRIEF DESCRIPTION OF THE DRAWINGS

FIG. 4 is a top plan view of the glider in partially folded position with the wing sail broken away in part and the cables omitted.

FIG. 7 is a side view of the master hinge bracket taken along the line 7—7 of FIG. 6.

FIG. 8 is a top plan view of the front fitting.

FIG. 9 is a front elevational view along the line 9—9 of FIG. 8.

FIG. 10 is a sectional view of the pivotal connection of the outer ends of the cross brace members with the spar members.

FIG. 11A is a detail view of the connection of the flexible cross member of the control bar with the legs of the control bar.

FIG. 12A is a view of the turnbuckle used to tighten certain of the cables of the glider.

FIG. 12B is a view of an optional cable tightening arrangement.

DESCRIPTION OF THE PREFERRED EMBODIMENT

Figure 1:
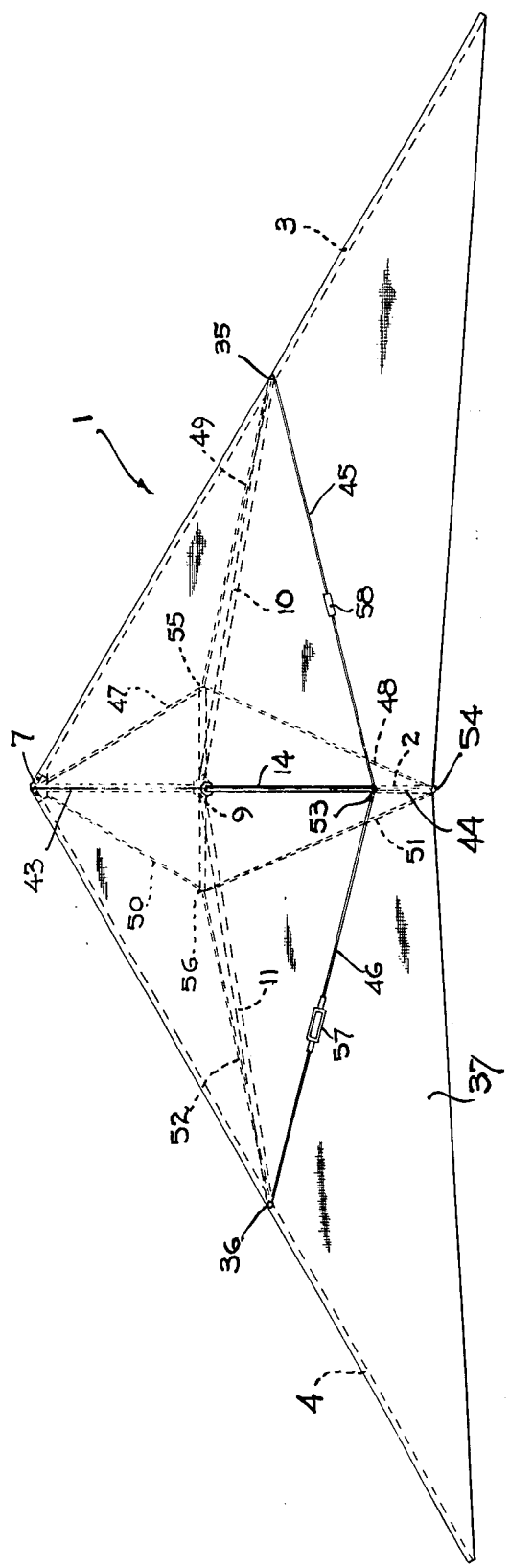
FIG. 1 is a top plan view of the glider

Referring to the drawings and particularly to FIGS. 1, 2, 3, 8 and 9, there is shown a glider referred to generally as 1, having a keel 2 to which are pivotally connected, as shown in FIGS. 8 and 9, left and right leading edge spar members 3 and 4, respectively, by bolts 5 and 6 to plate members 7 and 7A which are fastened to keel 2 by bolt 8. Tang 72 is also attached to plate 7 by bolt 8 and is utilized for connecting cables thereto.

Figure 5:
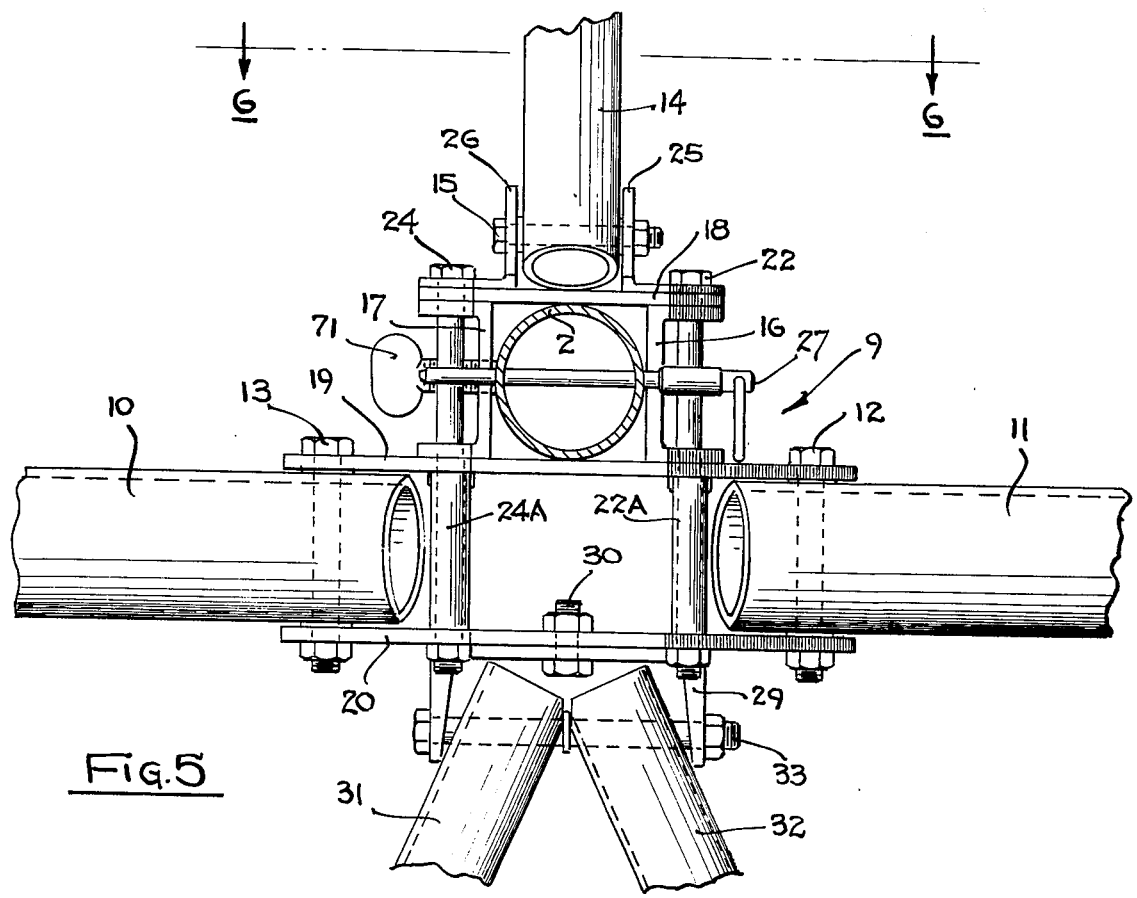
FIG. 5 is a front view of the master hinge bracket.
Figure 6:
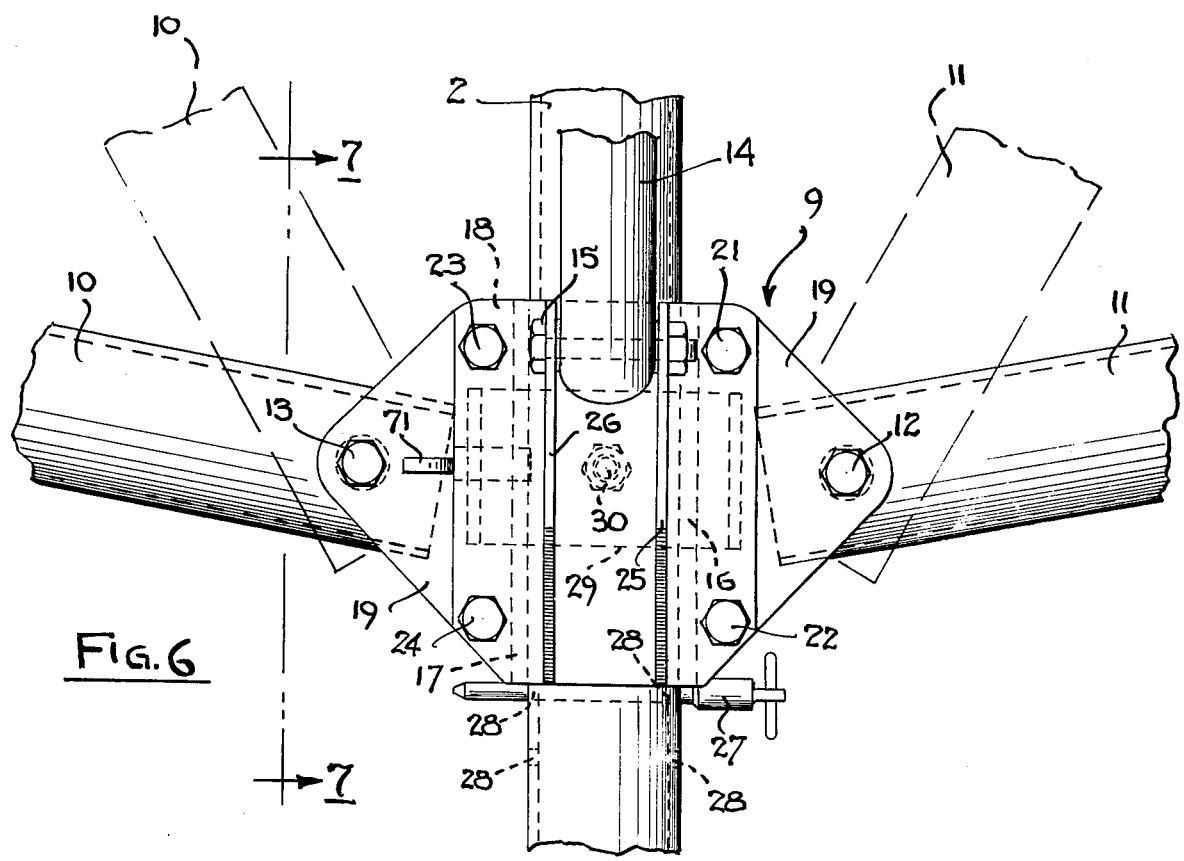
FIG. 6 is a top plan view of the master hinge bracket taken along the line 6—6 of FIG. 5.

Slidably mounted on keel 2 is a master hinge bracket 9 to which, as shown in FIGS. 5 and 6, are pivotally attached right and left cross brace members 10 and 11, respectively, by bolts 12 and 13. The outer ends of members 10 and 11 are pivotally connected to spar members 3 and 4 at 35 and 36 by identical connections, one of which is shown in FIG. 10. King post 14 is pivotally mounted on bracket 9 by bolt 15.

Bracket 9, as shown in FIGS. 5, 6 and 7, comprises channel members 16 and 17 and plate members 18, 19 and 20, all of which are fastened together by bolts 21, 22, 23 and 24. Channel members 16 and 17 and plates 18 and 19 are suitably spaced so that keel 2 is freely slidable with respect thereto.

Angle members 25 and 26, upon which king post 14 is pivotally mounted, are also bolted to bracket 9 by bolts 21, 22, 23 and 24. Spacer sleeves 22A and 24A are provided around bolts 22 and 24 to properly locate plate 20. Detent pin 27 is placed in opening 28 in keel 2 for restraining forward movement of the bracket beyond a desired position. It is understood that a number of openings 28 are provided in keel 2 for different adjusted positions of bracket 9 on keel 2.

Pin 27 is located adjacent the forward end of bracket 9 to prevent the bracket from moving forward to collapse the glider. This pin also holds the bracket in preselected positions to provide desired adjustment of the billow of the sail and the dihedral of the frame.

Figure 11B:
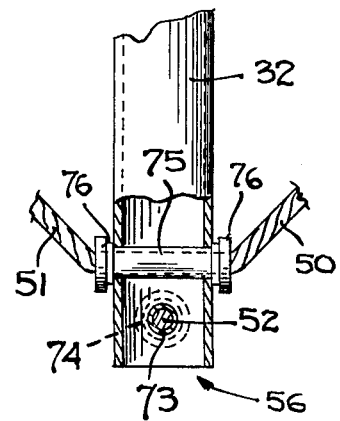
FIG. 11B is a view taken along line 11B of FIG. 11A.

Channel member 29 is connected by bolt 30 to lower plate 20 of bracket 9. Inflexible right and left leg members 31 and 32, respectively, are pivotally connected to channel 29 by bolt 33. A cross bar 34 of flexible material having an opening 34A therethrough is connected to leg members 31 and 32 by cable 52 as typically shown in FIG. 11A to form a control bar for controlling the flight of the glider by weight shifting of the pilot. Cable 52 extends through busing 73 which is held in place in leg 32 by flanges 74, and into and through opening 34A of base member 34. Referring to FIG. 11B, cable 51 extends through bushing 75 which is held in place in leg 32 by flanges 76. A similar arrangement is utilized at the lower end of leg 31. It is understood that the cables extending through the bushings are continuous even though given different numbers as they enter and leave the bushings.

A pilot seat or swing (not shown) is suitably attached to bracket 9 or keel 2 in a manner well known in the art.

Figure 17:
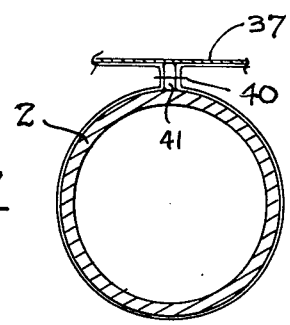
FIG. 17 is a view along the line 17—17 of FIG. 15.
Figure 15:
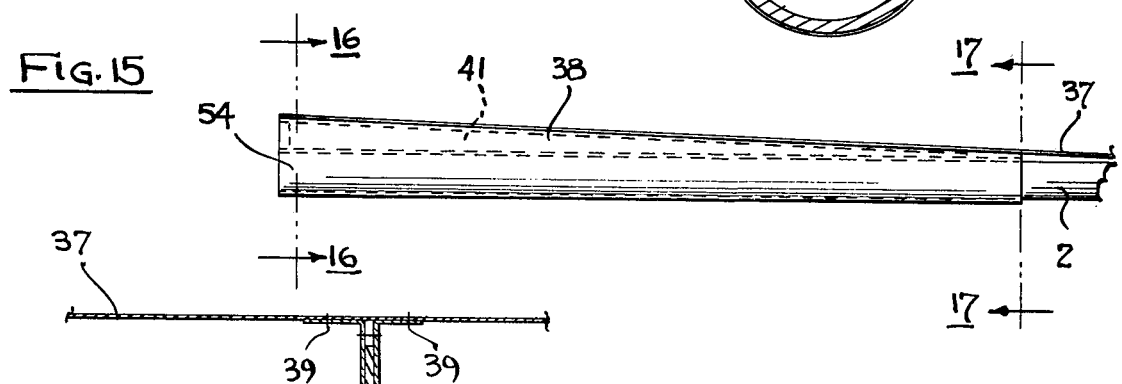
FIG. 15 is an elevational view of the web connecting the wing sail to the keel of the glider.
Figure 16:
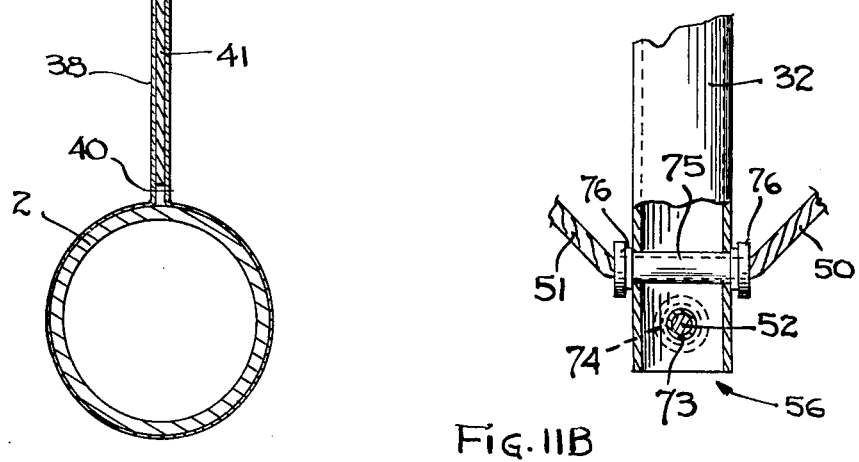
FIG. 16 is a view along the line 16—16 of FIG. 15.

A wing sail 37 of suitable flexible material such as Nylon, Dacron, Polyethylene, woven fabric, or the like, is attached to spar members 3 and 4 along their entire length in any suitable manner such as by wrapping an edge around the spar member and sewing it in place. The wing sail is attached to the keel along approximately the rear one-fourth portion thereof as illustrated in FIGS. 15, 16 and 17. As shown in these figures, the wing sail is attached to the keel by web member 38 which is sewed to the under side of the wing sail at 39 and also wrapped around the keel and sewed at 40. A batten 41 is provided between the two layers of material forming web 38. As illustrated in FIG. 15, web 38 increases in depth from approximately zero at line 17—17 to several inches at the extreme rearward end of the keel. This arrangement provides negative lift in the rearward portion of the wing which increases the inherent vertical or pitch stability of the glider.

Attachment of the sail to only the rear portion of the keel provides greater camber of the wing sail than when the sail is attached to the keel along its entire length.

Wing sail 37 is provided with an opening 42 as shown in FIG. 7 for the king post 14 to extend therethrough whereby upon forward movement of bracket 9 to collapse the glider, the king post will slide under the wing sail 37 into collapsed position.

Figure 3:
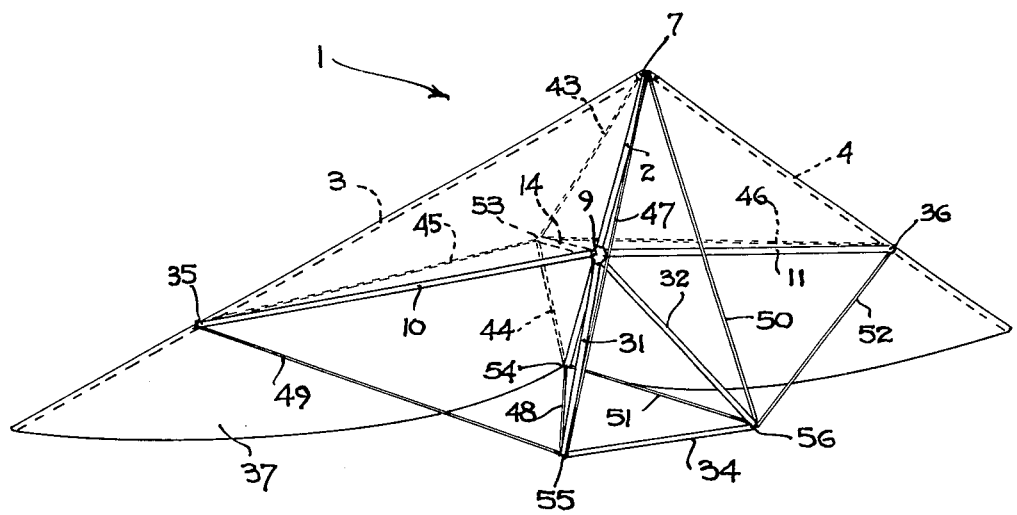
FIG. 3 is a front perspective view of the glider tilted upwardly to show the under side thereof.

The glider is held together and conditioned for flight by upper or "landing" cables 43, 44, 45 and 46 and lower or "flying" cables 47, 48, 49, 50, 51 and 52 as more particularly shown in FIG. 3.

Cables 43, 44, 45 and 46 are connected from the top of king post 14 at 55 to, respectively, the front end of keel 2 at 7, the rear end of keel 2 at 54, the outer end of cross brace member 10 at 35 and the outer end of cross brace member 11 at 36.

Cables 47, 48 and 49 are connected from the lower end of leg 31, respectively, to the front end of keel 2 at 7, the rear end of keel 2 at 54 and the outer end of cross brace member 10 at 35. Cables 50, 51 and 52 are connected from the lower end of leg 32, respectively, to the front end of keel 2 at 7, the rear end of keel 2 at 54 and to the outer end of cross brace member 11 at 36. These connections are made by the use of thimbles in a manner well known in the cable fastening art.

Figure 2:
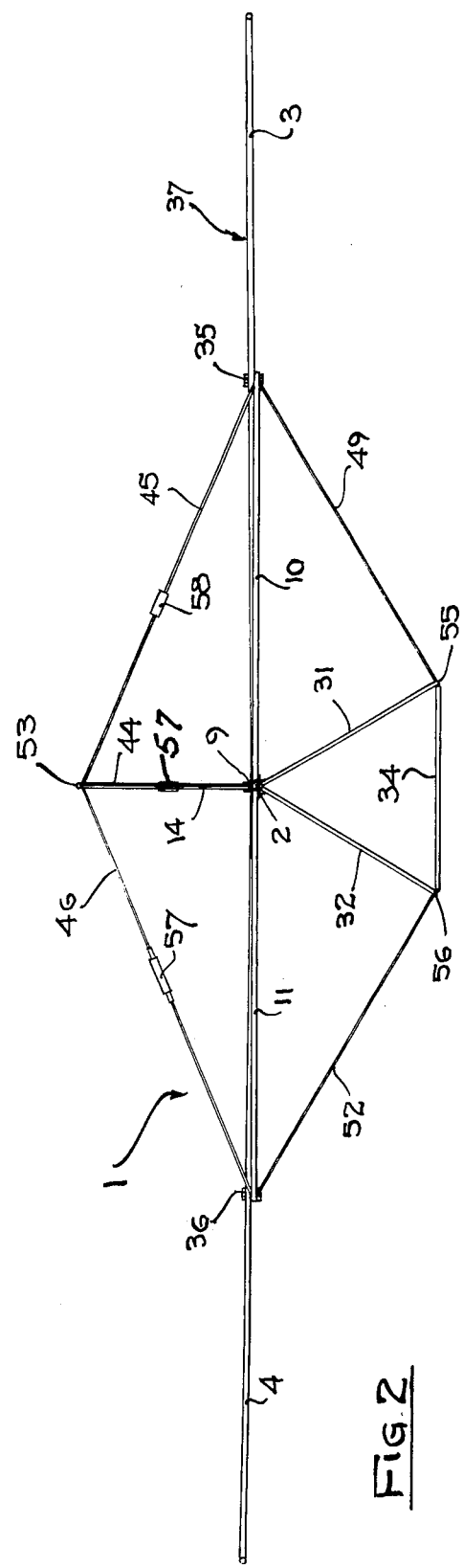
FIG. 2 is a rear elevational view with the sail of the glider in a horizontal position.

In the operation of the device, with the glider in partially collapsed condition as shown in FIG. 4, bracket 9 is moved rearwardly on keel 2 to spread leading edge members 3 and 4 outwardly by action of cross brace members 10 and 11 to extended position as shown in FIGS. 1, 2 and 3. King post 14 moves upwardly when bracket 9 moves rearwardly, sliding through opening 42 in wing sail 37. Control bar legs 31 and 32 and cross bar 34 move into operative position through interaction of the cables attached thereto which stiffen bar 34. Bracket 9 is positioned slightly forward of a line connecting the outer ends of cross brace members 10 and 11 and restrained from forward movement as shown in FIG. 6 by pin 27 placed in a selected opening 28 according to the desired billow of the wing sail and dihedral of the frame. The cables may be adjusted manually by use of the turnbuckle arrangement shown in FIG. 12A. A threaded rod 46A is connected to the cable 46 for engagement with threads in turnbuckle 57. Normally, only one of the cables from the king post to the forward end of the keel and one of the cables from the king post to the end of the cross brace member needs to be adjusted to bring the entire cable system into a taut condition. Once adjusted, the cables become automatically taut for that particular adjustment when the glider is extended from collapsed to flying condition.

The arrangement shown in FIG. 12B may be used when it is desired to provide automatic adjustment of the cable system. Spring 59 is selected according to the desired amount of tensioning of the cable system. This spring is contained within a bungee 58 between flange 60 on cable 45 and cap 58A of the bungee.

It is understood that either of the arrangements shown in FIGS. 12A or 12B may be used on cable 43 from the top of king post 14 to the front end of keel 2 at 7.

When it is desired to adjust the position of bracket 9 to increase or decrease the billow of the sail and the dihedral of the frame, pin 27 is placed in a desired opening 28 according to desired adjustment. A forward position of bracket 9 provides increased billow and dihedral for novice use while a rearward position of bracket 9 is better adapted for use by an expert.

Figure 13:
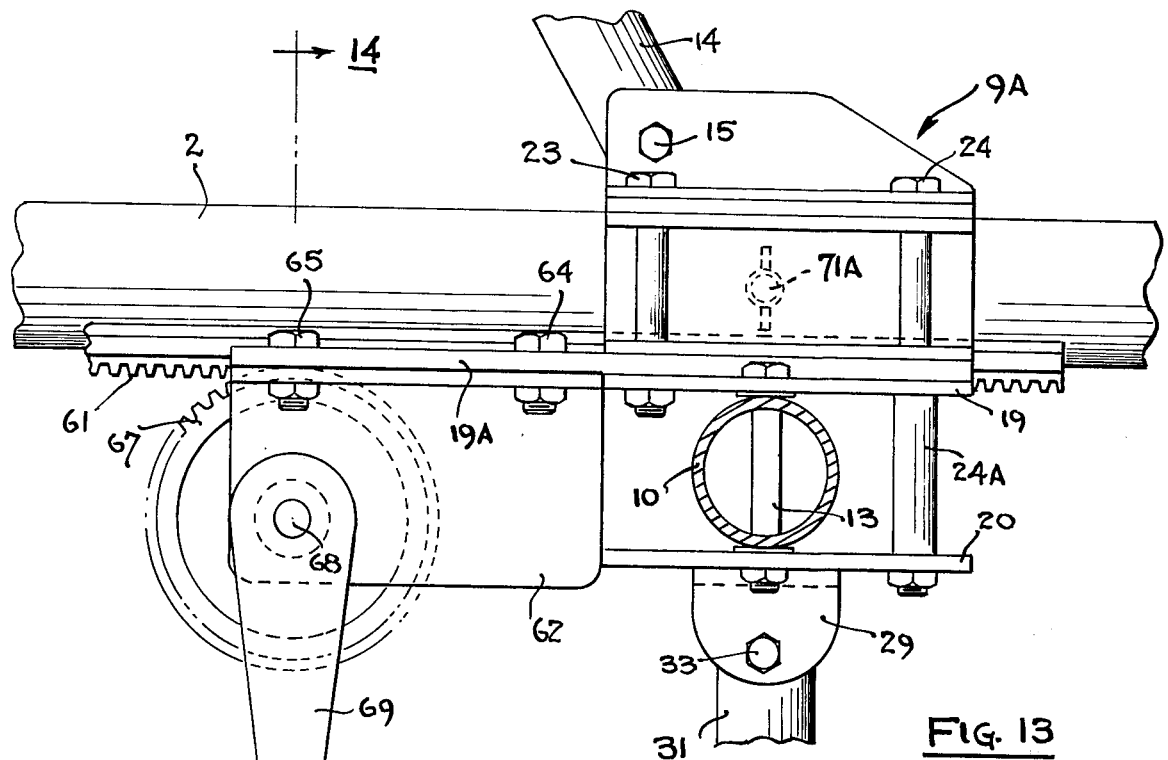
FIG. 13 is an elevational view of an optional master hinge bracket and adjusting means therefor.
Figure 14:
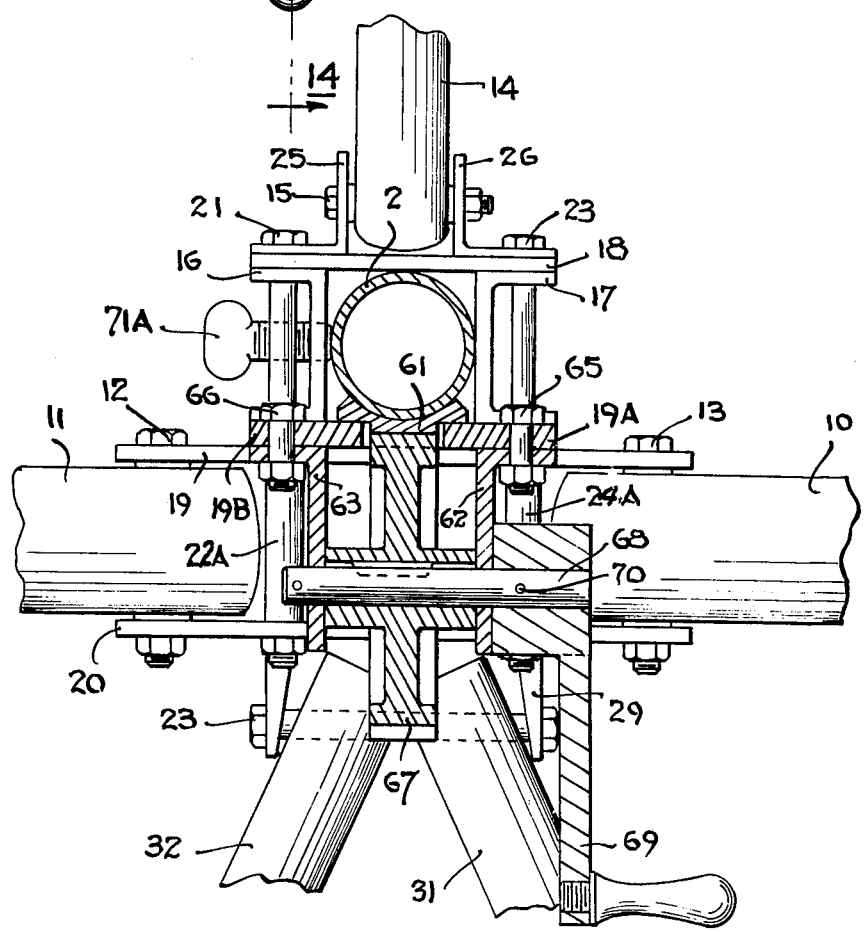
FIG. 14 is a view along the line 14—14 of FIG. 13.

When experts desire to change the billow of the sail and the dihedral of the frame during flight, the arrangement shown in FIGS. 13 and 14 is used. FIGS. 13 and 14 illustrate a modified form of master control bracket whereby the billow of the sail and the dihedral of the frame may be changed in flight as well as on the ground. In this arrangement, a rack 61 is attached to the lower part of keel 2 in any suitable manner such as by welding, adhesives, or otherwise. Spacer members 19A and 19B are provided for properly locating rack 61 in bracket 9A. Angle members 62 and 63 are attached to bracket 9A by four bolts, three of which are shown as 64, 65 and 66. A pinion 67 is fastened to shaft 68 by pin 70 whereby rotation of handle 69 will move bracket 9A forwardly or backwardly along keel 2 a desired amount to adjust the billow of the sail and the dihedral of the frame as desired. Set screw 71A is adapted to hold bracket 9A in adjust position.

Brackets 9 and 9A are normally located sufficiently forward of a line connecting the outer ends of the cross brace members 10 and 11 so that the cross brace members make an angle of about 10° with a line connecting their ends. In this position, the glider is sensitive to forward and rearward movement of bracket 9 or 9A to change the billow of the sail and the dihedral of the frame.

Although a preferred embodiment of the invention has been shown and described, it is understood that the scope of this invention shall be limited only by the appended claims.

What is claimed is:

1. A foot-launched, lightweight, person-carrying wing comprising:
    a keel,
    right and left leading edge members pivotally connected at their forward ends to the forward end of said keel,
    a master hinge bracket slidable on said keel,
    right and left cross brace members pivotally connected at their inner ends to said bracket and at their outer ends respectively, to said right and left leading edge members,
    a king post pivotally connected to said bracket and extending upwardly and rearwardly therefrom,
    said keel, leading edge members and cross brace members forming a frame,
    a control bar pivotally connected to said bracket and having a right and a left leg which extend downwardly and outwardly from said bracket, and a base connecting the ends of said legs,
    flexible cables connecting the lower end of the right leg of said control bar to, respectively; the front end of said keel, the rear end of said keel, and the outer end of said right cross brace member,
    flexible cables connecting the lower end of the left leg of said control bar to, respectively; the front end of said keel, the rear end of said keel, and the outer end of said left cross brace member,
    flexible cables connecting the top of said king post to; the front end of said keel, the rear end of said keel and the outer ends of said right and left cross brace members,
    a wing sail covering said frame and connected to said leading edge members along their entire length and to the rear portion only of said keel,
    said bracket being movable (a) forwardly to pivot said leading edge members inwardly, said king post downwardly and said control bar upwardly to collapse said frame and (b) rearwardly to erect said frame into operative position.

2. A device as recited in claim 1 and further including means for moving said bracket incrementally on said keel to move said leading edge members inwardly or outwardly a predetermined amount to simultaneously adjust the billow of said sail and the dihedral of said frame.

3. A device as recited in claim 1 in which said sail is provided with an opening through which said king post extends, said king post being retracted through said opening to a position under said sail when said frame is retracted to folded position.

4. A device as recited in claim 1 in which said cables are of such length that they become taut when said bracket is moved to its rearward position to fully extend said frame.

5. A device as recited in claim 1 in which the base portion of said control bar is made of flexible material which is hollow, one of said cables passing through said hollow base portion to rigidify the same when said frame is extended and said cables become taut.

6. A device as recited in claim 1 in which at least one of said cables from said king post to the forward end of said keel is provided with a tensioning device to maintain said cable taut in different positions of said bracket on said keel.

7. A device as recited in claim 1 in which at least one of said cables from said king post to the ends of said cross brace members is provided with a device for maintaining said cable taut in different positions of adjustment of said bracket on said keel.

8. A device as recited in claim 1 in which said wing sail is attached to the rear portion of said keel by a web member which spaces the rear portion of said wing sail from said keel.

9. A device as recited in claim 1 in which said wing sail is attached to the rear portion of said keel by a web member which spaces the rear portion of said wing sail from said keel by an amount which varies from several inches at the rear end of said keel to approximately zero at a point about one-fourth the length of said keel from the rear end thereof.

10. A device as recited in claim 1 in which said master hinge bracket is normally located forwardly of a line connecting the outer ends of said cross brace members.

* * * * *